United States Patent
Sato et al.

(10) Patent No.: US 6,476,138 B2
(45) Date of Patent: *Nov. 5, 2002

(54) OLEFIN-BASED RESIN COMPOSITION

(75) Inventors: Masashi Sato, Yokkaichi (JP); Tatsuya Hase, Yokkaichi (JP); Hiroshi Fujimoto, Yokkaichi (JP)

(73) Assignees: Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 4 days.

This patent is subject to a terminal disclaimer.

(21) Appl. No.: 09/759,217

(22) Filed: Jan. 16, 2001

(65) Prior Publication Data

US 2002/0099141 A1 Jul. 25, 2002

(30) Foreign Application Priority Data

Nov. 30, 2000 (JP) ........................................ 2000-364859

(51) Int. Cl.⁷ .......................... C08L 23/00; C08L 23/04; C08F 8/00
(52) U.S. Cl. ........................ 525/191; 525/192; 525/194; 525/195; 525/222; 525/240
(58) Field of Search ................................ 525/191, 192, 525/194, 195, 222, 240

(56) References Cited

U.S. PATENT DOCUMENTS

| | | |
|---|---|---|
| 4,622,350 A | 11/1986 | Icenogle et al. |
| 4,722,959 A | 2/1988 | Inoue et al. |
| 4,794,132 A | 12/1988 | Djiauw et al. |
| 4,826,899 A | 5/1989 | Rees |
| 4,853,154 A | 8/1989 | Icenogle et al. |
| 4,863,995 A | 9/1989 | Murakami et al. |
| 4,942,069 A | 7/1990 | Keogh |
| 4,952,428 A | 8/1990 | Keogh |
| 4,983,742 A | 1/1991 | Yusawa et al. |
| 5,025,042 A | 6/1991 | Yoshida et al. |
| 5,057,367 A | 10/1991 | Morii et al. |
| 5,104,920 A | 4/1992 | Keogh |
| 5,211,746 A | 5/1993 | Keogh et al. |
| 5,262,467 A | 11/1993 | Keogh et al. |
| 5,317,051 A | 5/1994 | Harashige et al. |
| 5,401,787 A | 3/1995 | Tonyali |
| 5,418,272 A | 5/1995 | Kawabata et al. |
| 5,444,809 A | 8/1995 | Aoki et al. |
| 5,468,807 A | 11/1995 | Tsurutani et al. |
| 5,473,016 A | 12/1995 | Fujii et al. |
| 5,476,709 A | 12/1995 | Inoue et al. |
| 5,482,990 A | 1/1996 | Jow et al. |
| 5,561,185 A | 10/1996 | Hashimoto et al. |
| 5,573,840 A | 11/1996 | Inoue et al. |
| 5,656,371 A | 8/1997 | Kawahigashi et al. |
| 5,670,748 A | 9/1997 | Gingue et al. |
| 5,698,323 A | 12/1997 | Keough et al. |
| 5,707,732 A | 1/1998 | Sonoda et al. |
| 5,747,574 A | 5/1998 | Kanamori |
| 5,889,087 A | 3/1999 | Hayashi et al. |
| 5,973,070 A | 10/1999 | Baann |
| 6,025,422 A | 2/2000 | Hall |
| 6,025,423 A | 2/2000 | Breant |
| 6,034,162 A * | 3/2000 | Mizutani et al. ............ 428/921 |
| 6,200,679 B1 | 3/2001 | Hase et al. |

FOREIGN PATENT DOCUMENTS

| | | |
|---|---|---|
| DE | 4230157 | 12/1993 |
| DE | 4440394 | 5/1995 |
| EP | 0508415 | 10/1992 |
| EP | 0530940 | 3/1993 |
| EP | 0871181 | 10/1998 |
| EP | 0972803 | 1/2000 |
| JP | 7-78518 | 3/1995 |
| JP | 7-176219 | 7/1995 |
| JP | 7-182930 | 7/1995 |
| WO | 96/22328 | 7/1996 |

OTHER PUBLICATIONS

English Language Abstract of JP 7–176219.
English Language Abstract of JP 7–78518.
Derwent Abstract No. 1994–361016 (Oct. 7, 1994).
Derwent Abstract No. 1994–129459 (Mar. 18, 1994).

* cited by examiner

*Primary Examiner*—Nathan M. Nutter
(74) *Attorney, Agent, or Firm*—Greenblum & Bernstein, P.L.C.

(57) ABSTRACT

There is provided an olefin-based resin composition which may be applied to the coatings of electrical cables used in automobiles. The coatings have neatly balanced properties to satisfy product requirements, such as wear and flame resistance, tensile strength, flexibility, and heat and freeze resistance. The olefin-based resin composition includes: (i) a polymeric material in an amount of 100 parts by weight which includes: (a) about 50 to 95 parts by weight of propylene polymer portion including at least one propylene polymer having a melt flow rate of up to about 5 g/10 min; (b) about 1 to 20 parts by weight of at least one polyolefin, a proportion of about 0.1 to 10% by weight of which is structurally modified through maleic acid anhydride treatment; and (c) about 5 to 40 parts by weight of olefin-based apolymer portion including at least one ethylene-α-olefin copolymer; and (ii) about 30 to 200 parts by weight of at least one metal-hydroxide, wherein the at least one metal hydroxide is treated with silane coupling agent.

34 Claims, No Drawings

OLEFIN-BASED RESIN COMPOSITION

BACKGROUND OF THE INVENTION

1. Field of the Invention

The present invention relates to olefin-based resin compositions, and more preferably halogen-free olefin-based resin compositions. These compositions are used for the coatings of electrical cables used in the automobile industry. These compositions therefore preferably satisfy requirements of the car industry, such as wear resistance, flame resistance, tensile strength and flexibility, among others.

2. Discussion of Background Information

Poly(vinylchloride) has mainly been the coating material for electrical cables in automobile applications. The reason is that this polymer has good mechanical strength, formability at extrusion with electrical cables, flexibility and paintability. The poly(vinylchloride) also provides an inexpensive material.

Recently, however, global environmental concerns have compelled the auto industry to reconsider the choice of product types used for automobile parts, including coating materials for electrical cables. As a result, poly(vinylchloride) is currently being replaced by halogen-free resin materials.

As a consequence, there have been investigations into wear-resistant resin compositions that do not generate toxic gases, such as halogen gases, when they are burned. Such compositions include halogen-free compositions containing a polyolefin-based polymer and a metal hydroxide as a flame retardant, as disclosed in Japanese patent applications published under Nos. HEI 7-176219 and HEI 7-78518, the disclosure of which are herein incorporated by reference in their entireties. Further, Japanese patent application published under No. HEI 7-182930, the disclosure of which is herein incorporated by reference in its entirety, describes a composition containing a polymeric material mixture consisting of a polypropylene-type resin, a polyethylene treated with an unsaturated carboxylic acid, and an ethylene-type copolymer, on the one hand, and a metal hydroxide, on the other.

However, when the compositions described supra are used in order to retard combustion or perform auto-extinction of the flame, a large amount of metal hydroxide must be added to the compositions. The compositions then acquire extremely low mechanical properties, such as a low wear resistance and tensile strength. In order to avoid the drop in mechanical strength, it has been contemplated to add polypropylene or a high-density polyethylene which are relatively hard resins. However, electrical cables coated with such compositions then become less flexible and less formable.

SUMMARY OF THE INVENTION

An aspect of the present invention is therefore to provide an olefin-based resin composition which is preferably substantially free of halogen and has well-balanced properties required for the coatings of electrical cables used in automobiles. These requisite properties include wear resistance, flame resistance, tensile strength, flexibility, heat resistance and low-temperature (freeze) resistance.

To this end, there is provided an olefin-based resin composition comprising:

(i) a polymeric material in an amount of 100 parts by weight which includes:

(a) about 50 to 95 parts by weight of propylene polymer portion comprising at least one propylene polymer having a melt flow rate of up to about 5 g/10 min;

(b) about 1 to 20 parts by weight of at least one polyolefin, a proportion of about 0.1 to 10% by weight of which is structurally modified through maleic acid anhydride treatment; and (c) about 5 to 40 parts by weight of olefin-based polymer portion comprising at least one ethylene-α-olefin copolymer; and (ii) about 30 to 200 parts by weight of at least one metal hydroxide, wherein the at least one metal hydroxide is treated with silane coupling agent.

Preferably, the polyolefin portion treated with maleic acid anhydride (b) accounts for about 5 to 20% by weight of the polymeric material (i), the olefin-based polymer portion (c) accounts for about 5 to 30% by weight of the polymeric material, and the metal hydroxide product (ii) comprises at least one metal hydroxide in an amount of about 50 to 150 parts by weight relative to 100 parts by weight of the polymeric material (i).

More preferably, the metal hydroxide product (ii) comprises at least one metal hydroxide in an amount of about 70 to 90 parts by weight relative to 100 parts by weight of the polymeric material.

Suitably, the propylene polymer portion (a) comprises at least one of propylene-ethylene block copolymer in which propylene constitutes at least about 50% by weight of the block copolymer, propylene-ethylene random copolymer in which propylene constitutes at least about 50% by weight of the random copolymer, and propylene homopolymer.

Preferably, the polyolefin portion treated with maleic acid anhydride (b) comprises at least polypropylene structurally modified through maleic acid anhydride treatment.

Further, the olefin-based polymer portion (c) may comprise at least one of ethylene-vinyl acetate copolymer and ethylene-ethyl acrylate copolymer.

Preferably, the metal hydroxide product (ii) comprises magnesium hydroxide.

In a preferred embodiment, the silane coupling agent comprises aminosilane coupling agent.

As understood from the above, the present invention provides an olefin-based resin composition which is preferably substantially free of halogen.

The invention also concerns an electrical cable coated with, or clad in, such an olefin-based resin composition.

DETAILED DESCRIPTION

The above and other aspects, features and advantages of the invention will be made apparent from the following illustrative description.

All percent measurements in this application, unless otherwise stated, are measured by weight based upon 100% of a given sample weight. Thus, for example, 30% represents 30 weight parts out of every 100 weight parts of the sample.

Unless otherwise stated, a reference to a compound or component, includes the compound or component by itself, as well as in combination with other compounds or components, such as mixtures of compounds.

The propylene polymer portion (a) having a melt flow rate (MFR) of up to about 5 g/10 min., preferably ranging from 0.1 to 5 g/10 min., includes, for example, propylene homopolymer, and block or random copolymer of propylene and ethylene in which propylene accounts for at least about 50% by weight of the corresponding block or random copolymer.

Examples of such propylene polymer portion include RB610A (block copolymer), RB410 (random polymer) and RB110 (homopolymer), manufactured and commercialized by TOKUYAMA CORP.

When the proportion of such propylene polymer portion (a) exceeds the above-mentioned upper limit of about 95% by weight of the polymeric material (i), the composition obtained becomes less flexible and less formable.

Conversely, when its proportion is less than the lower limit of about 50% by weight, the composition becomes less resistant to wear.

In the above embodiments, the MFR is measured according to the method based on Standard JIS K 6921-2.

Examples of the polyolefin portion (b) treated with maleic acid anhydride include polyethylene, polypropylene, polybutene, ethylene-vinyl acetate copolymers (EVA), ethylene-ethyl acrylate copolymers (EEA), ethylene-methyl acrylate copolymers (EMA), ethylene-methyl methacrylate copolymers, ethylene propylene rubber and ethylene-butene copolymers. A preferred example is polypropylene treated with maleic acid anhydride, since it gives an inventive composition having a sufficient level of hardness and wear resistance, without performing cross-linking.

The proportion of polyolefin portion (b) treated with maleic acid anhydride in the polymeric material (i) ranges from about 1 to 20%, preferably from about 5 to 20% by weight.

When its proportion exceeds the upper limit of about 20% by weight, the polyolefin reacts strongly with the metal hydroxide, so that the tensile elongation (elongation rate at breaking point) of the composition becomes reduced, and the composition becomes less flexible.

Conversely, when its proportion is less than the lower limit of about 1% by weight, wear resistance of the composition cannot be improved.

Preferred examples of the ethylene-α-olefin copolymer of the olefin-based polymer portion (c) include ethylene-vinyl acetate copolymer (EVA) and ethylene-ethyl acrylate copolymer (EEA). The proportion of α-olefin in the above ethylene-α-olefin copolymer is not particularly limited.

EVA used in the Examples of the present invention had either 25% or 46% by weight of vinyl acetate, as shown in the Tables. EEA used in the Examples of the invention had 15% by weight of ethyl acrylate, as also shown in the Tables.

The proportion of ethylene-α-olefin copolymer of the olefin-based polymer portion (c) in the polymeric material (i) preferably ranges from about 5 to 40%, more preferably about 5 to 30% by weight.

When its proportion exceeds the upper limit of about 40% by weight, the composition obtained becomes less resistant to wear.

Conversely, when its proportion is less than the lower limit of about 5% by weight, the composition obtained becomes hard and less formable.

Examples of the metal hydroxide product (ii) include magnesium hydroxide and aluminum hydroxide, preferably in their particle form. The metal hydroxide particles used in the invention are preferably treated with coupling agent, preferably a silane coupling agent. The silane coupling agent includes, e.g., aminosilane coupling agent, a vinylsilane coupling agent and an epoxysilane coupling agent. Coupling agents also include higher fatty acids such as stearic acid and oleic acid. Among the above examples, magnesium hydroxide treated with aminosilane coupling agent is most preferably used.

The part of metal hydroxide product (ii), added to 100 parts by weight of the polymeric material (i), preferably ranges from about 30 to 200, more preferably from about 50 to 150, even more preferably from about 70 to 90 parts by weight.

When the portion of metal hydroxide product (ii) is too high, the composition obtained suffers deterioration in elongation rate, wear resistance, flexibility and formability.

On the other hand, when the proportion is too low, flame resistance of the composition is impaired.

The olefin-based resin composition of the present invention may further contain an appropriate amount of additives, such as usual additives, such as anti-oxidants, copper-damage inhibitors and lubricants, so far as they do not impede the above described product features.

The inventive olefin-based resin composition can be prepared by mixing and kneading the polymeric material (i) and the metal hydroxide product (ii) supra in any manner such as according to known methods.

When the inventive composition is applied to the coatings of electrical cables used in automobiles, these coatings preferably satisfy required wear resistance, flame resistance, tensile strength, flexibility, heat resistance, freeze resistance, etc. Above all, these coatings preferably generate no halogen gas.

The aminosilane coupling agents contain, in their molecule, functional groups reacting with inorganic compounds and those reacting with organic compounds. Accordingly, when a metal hydroxide is treated with aminosilane coupling agent, the former is bound to the latter through those functional groups reacting with inorganic compounds. When the thus-treated metal hydroxide is added to the composition, the metal hydroxide becomes firmly bound to maleic acid anhydride combined with the polyolefin portion (b) or the olefin-based polymer portion (c) through the aminosilane's functional groups which react with organic compounds. As a result, wear resistance of, the inventive composition is markedly improved.

When an amino group (as in the above case) and/or an epoxy group is (are) present at the oleophilic group side of the silane coupling agent, that (those) group(s) react(s) with the maleic acid anhydride combined with the polyolefin portion (b) or the olefin-based polymer portion (c), so that the hydrophilicity of such groups is suppressed. As a result, the composition becomes mechanically stronger and more waterproof.

EXAMPLES

The invention will be described hereafter with reference to non-limiting prophetic Examples and Comparative Examples. In this regard, each of the Examples and Comparative Examples involves magnesium hydroxide treated with an aminosilane coupling agent having a certain tradename. The use of this tradename with this magnesium hydroxide which was used to generate the data in the Examples and Comparative Examples is proprietary information here. Accordingly, magnesium hydroxide treated with an aminosilane coupling agent having a different tradename, i.e., "MAGNIFIN H5IV", was substituted in the Examples and Comparative Examples for the magnesium hydroxide treated with an aminosilane coupling agent used to generate the data. Testing has been conducted to show that "MAGNIFIN H5IV" magnesium hydroxide treated with an aminosilane coupling agent, manufactured by ALUSUISSE MARTINSWERK GmbH, functions equivalent to the magnesium hydroxide treated with an aminosilane coupling agent having the proprietary tradename, i.e., the magnesium hydroxide used to generate the data.

Examples 1 to 5 and Comparative Examples 1 to 6

The components indicated in the upper part of the corresponding columns in Tables I and II were mixed in indicated amounts. The resultant mixtures were kneaded in a biaxial extruder at 250° C.

The obtained compositions were extruded around a conductive cable regulated by ISO as 0.5 sq (7/0.32 soft copper wires, indicating 7 wires respectively having a diameter of 0.32 mm, and forming a conductor with a cross-section area of 0.5 mm$^2$), to yield a coating thickness of 0.3 mm. The extrusion was performed in dies having a diameter of 1.6 mm and 1.0 mm, respectively, and nipples; at a die temperature of 210 to 230° C. and a cylinder temperature of 200 to 240° C.; and at a line speed of 100 m/min.

The terms in Tables I and II are defined as follows.

"Propylene BP" indicates:

a propylene-ethylene block copolymer of MFR 0.5 g/10 min., i.e., "RB610A" manufactured by TOKUYAMA CORP., is used for Examples 1 to 9 and Comparative Examples 1 to 10, except for Comparative Example 6;

a propylene-ethylene block copolymer of MFR 6.5 g/10 min., i.e., "MK640" manufactured by TOKUYAMA CORP., is used for Comparative Example 6.

"MAH-PP" indicates polypropylene, 1% by weight of which is treated with maleic acid anhydride.

"EVA" indicates ethylene-vinyl acetate copolymer having either 25% or 46% by weight of vinyl acetate as shown in the Tables.

"EEA" indicates ethylene-ethyl acrylate copolymer having 15% by weight of ethyl acrylate.

"MAGNIFIN H51IV" indicates magnesium hydroxide treated with aminosilane coupling agent, manufactured by ALUSUISSE MARTINSWERK GmbH.

The anti-aging agent was a hindered phenol compound, i.e., "TOMINOX TT", manufactured by YOSHITOMI FINECHEMICALS, Ltd.

The coated electrical cables of Examples 1 to 5 and Comparative Examples 1 to 6 were subjected to tests for flame resistance, tensile strength, elongation rate and wear resistance according to JASO D611 (Japanese Automobile Standard Organization).

To test heat resistance, a length of about 220 mm was cut out from a coated electrical cable, to obtain a sample. The conductive portion was then removed from the sample, thereby yielding a sample coating. The sample coating was hung in a gear oven set to 150° C. After 100 hours, the sample coating was allowed to stand at room temperature for 24 to 48 hours. The tensile strength and the elongation rate were then measured as indicated above. An elongation at breaking point (elongation rate) exceeding 125% was judged as good.

To test freeze resistance, a length of about 38 mm was cut out from the coated electrical cable to obtain a sample. The sample was then subjected to a testing device comprising a sample grip, a hitting bar and a thermostatic bath. The sample was firmly held by the sample grip. They were then dipped into the thermostatic bath frozen by using ethanol. After 2.5 minutes, frozen solvent temperatures were registered. The sample was then hit by the hitting bar, and the sample was inspected to detect whether the coating had a crack. The temperature at which the crack was formed was considered as the brittle temperature (fragilization temperature). When the brittle temperature was less than −20° C., the result was considered as good.

To test wear resistance, an abrasion frequency exceeding 300 times, averaged on 3 samples, was considered as good.

Flexibility was evaluated by hand feeling, when the coated electrical cable was bent.

Formability was evaluated by observing whether or not whiskers were formed, when coatings were stripped off from the end portion of coated electrical cable.

The results of the tests are shown in Tables I and II.

TABLE I

|  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Propylene BP | 60 | 65 | 68 | 60 | 60 | 85 | 85 | 80 | 70 |
| MAH-PP | 10 | 5 | 2 | 10 | 10 | 10 | 5 | 10 | 20 |
| EVA (VA 25%) | 30 | 30 | 30 |  |  | 5 | 10 | 10 | 10 |
| EVA (VA 46%) |  |  |  | 30 |  |  |  |  |  |
| EEA (EA 15%) |  |  |  |  | 30 |  |  |  |  |
| MAGNIFIN H5IV | 90 | 90 | 90 | 90 | 90 | 70 | 70 | 70 | 70 |
| Anti-aging agent | 1 | 1 | 1 | 1 | 1 | 1 | 1 | 1 | 1 |
| Total | 191 | 191 | 191 | 191 | 191 | 171 | 171 | 171 | 171 |
| Flame resistance | Good | Good | Good | Good | Good | Good | Good | Good | Good |
| Tensile strength (MPa) | 45.2 | 43.7 | 42.1 | 41.0 | 41.8 | 40.4 | 37.1 | 40.8 | 38.3 |
| Elongation rate (%) | 387 | 383 | 450 | 403 | 390 | 543 | 598 | 480 | 372 |
| Heat resistance |  |  |  |  |  |  |  |  |  |
| Tensile strength (MPa) | 36.8 | 35.2 | 34.4 | 33.5 | 31.9 |  |  |  |  |
| Tensile elongation (%) | 193 | 187 | 207 | 198 | 175 |  |  |  |  |
| Freeze resistance | Good | Good | Good | Good | Good |  |  |  |  |
| Wear resistance (frequencies) | 1424 | 923 | 747 | 565 | 1849 | 1290 | 314 | 521 | 648 |
| Flexibility | Good | Good | Good | Good | Good | Good | Good | Good | Good |
| Formability | Good | Good | Good | Good | Good | Good | Good | Good | Good |

Abbreviations:
Ex.: Example.

TABLE II

|  | Com. Ex. 1 | Com. Ex. 2 | Com. Ex. 3 | Com. Ex. 4 | Com. Ex. 5 | Com. Ex. 6 | Com. Ex. 7 | Com. Ex. 8 | Com. Ex. 9 | Com. Ex. 10 |
|---|---|---|---|---|---|---|---|---|---|---|
| Propylene BP | 70 | 90 | 40 | 90 | 60 | 60 | 100 | 90 | 100 | 60 |
| MAH-PP |  |  | 30 | 10 | 5 | 10 |  |  | 10 | 10 |
| EVA (VA 25%) |  | 10 |  |  |  | 30 |  | 10 |  | 30 |
| EVA (VA 46%) | 30 |  | 30 |  |  |  |  |  |  |  |
| EEA (EA 15%) |  |  |  |  | 35 |  |  |  |  |  |
| MAGNIFIN H5IV | 90 | 120 | 90 | 70 | 300 | 90 | 70 | 70 | 70 | 70 |
| Anti-aging agent | 1 | 1 | 1 | 1 | 1 | 1 | 1 | 1 | 1 | 1 |
| Total | 191 | 221 | 191 | 171 | 401 | 191 | 171 | 171 | 171 | 171 |
| Flame resistance | Good | Good | Good | Bad | Good | Good | Good | Good | Good | Good |
| Tensile strength (MPa) | 26.5 | 22.2 | 33.9 | 22.6 | 21.3 | 31.4 | 32.3 | 38.4 |  | 32.7 |
| Elongation rate (%) | 650 | 437 | 107 | 43 | 76 | 293 | 665 | 715 |  | 417 |
| Heat resistance |  |  |  |  |  |  |  |  |  |  |
| Tensile strength (MPa) | 27.5 | 25.4 | 34.5 | 20.6 | 20.1 | 31.7 |  |  |  |  |
| Tensile elongation (%) | 230 | 150 | 86 | 40 | 50 | 110 |  |  |  |  |
| Freeze resistance | Good | Good | Good | Good | Good | Bad |  |  |  |  |
| Wear resistance (frequencies) | 570 | 4726 | 4341 | 10000 | 103 | 2208 | 2131 | 128 | 2862 | 93 |
| Flexibility | Good | Bad | Bad | Bad | Bad | Good | Bad | Good | Bad | Good |
| Formability | Good | Bad | Good | Bad | Bad | Good | Bad | Good | Bad | Good |

Abbreviations:
Com. Ex.: Comparative Example.

Comparison of the results for Examples 1 to 5 with those for Comparative Example 1 indicates that the addition of a small quantity of polypropylene, treated with maleic acid anhydride, to the propylene block copolymer and ethylene-α-olefin copolymer greatly improves the wear resistance of the composition. This addition, besides, does not impede the flexibility and formability of the composition. This phenomenon can be explained by the fact that, as an aminosilane coupling agent (having amino groups) was used for treating magnesium hydroxide, these amino groups have reacted with the maleic acid anhydride groups of the anhydride-treated polypropylene.

According to the results obtained for Comparative Example 2, when the content of hard resin is increased, instead of adding polypropylene treated with maleic acid anhydride, the resultant composition is not flexible enough. Manufacture of coated electrical cables thus becomes more difficult.

The results obtained for Comparative Example 3 show that when the polypropylene treated with maleic acid anhydride is added in a great quantity, magnesium hydroxide becomes bound to the resin too firmly, so that the tensile elongation and flexibility of the composition are degraded.

The results obtained for Comparative Example 4 indicate that, unless ethylene-α-olefin copolymers are added, coated electrical cables become too hard, and their formability and flame resistance deteriorate.

According to the results obtained for Comparative Example 5, when magnesium hydroxide is added in a large amount, the elongation rate, wear resistance, flexibility and formability of the composition are degraded.

As indicated from the results obtained for Comparative Example 6, when the propylene polymer used has a MFR exceeding 5 g/10 min., the heat and freeze resistance of the composition is not good.

Examples 6 to 9 and Comparative Examples 7 to 10

The components shown in the upper part of the corresponding columns in Tables I and II were mixed in indicated amounts, and kneaded at 250° C. The compositions obtained were respectively extruded around an electrical cable (ISO conductor, 0.5 sq, 7/compressed 0.32 soft copper wire, as mentioned above), to yield a coating having a thickness of 0.2 mm. The extrusion was performed by using dies having a diameter of 1.3 mm and 0.88 mm, respectively, and nipples; at a die and a cylinder temperature of, respectively, 210 to 230 and 200 to 240° C.; and at a line speed of 100 m/min.

The flame resistance, tensile strength, tensile elongation, wear resistance, flexibility and formability of the obtained compositions were tested, as described for Examples 1 to 5 and Comparative Examples 1 to 6.

It can be concluded from the results obtained for Comparative Examples 7 and 9 that, unless ethylene-α-olefin copolymers are added, coated electrical cables become too hard and hardly formable.

The results obtained for Comparative Example 8 show that, when the amount of ethylene-α-olefin copolymer is increased, instead of adding polypropylene treated with maleic acid anhydride, the compositions obtained are sufficiently flexible and formable, but less resistant to the wear.

According to the results obtained for Examples 7 to 9, as the quantity of anhydride-treated polypropylene added increases, the wear resistance of the an compositions improves, but their elongation rate becomes somewhat reduced.

As can be deduced from the results obtained for Example 6, when the amount of ethylene-α-olefin copolymer is reduced, the wear resistance of the compositions improves.

According to the results obtained for Comparative Example 10, the wear resistance of the compositions deteriorates as the amount of ethylene-α-olefin copolymer increases, in spite of the addition of the anhydride-treated polypropylene.

Although the invention has been described with reference to particular means, materials and embodiments, it is to be understood that the invention is not limited to the particulars disclosed and extends to all equivalents within the scope of the claims.

The present disclosure relates to subject matter contained in priority Japanese Application No. 2000-364859, filed on Nov. 30, 2000, which is herein expressly incorporated by reference in its entirety.

What is claimed is:

1. An olefin-based resin composition comprising:
   (i) a polymeric material in an amount of 100 parts by weight which includes:
      (a) about 50 to 95 parts by weight of propylene polymer portion comprising at least one propylene polymer having a melt flow rate of up to about 5 g/10 min;
      (b) about 1 to 20 parts by weight of at least one polyolefin, a proportion of about 0.1 to 10% by weight of which is structurally modified through maleic acid anhydride treatment; and
      (c) about 5 to 40 parts by weight of olefin-based polymer portion comprising at least one ethylene-α-olefin copolymer; and
   (ii) about 30 to 200 parts by weight of at least one metal hydroxide, wherein the at least one metal hydroxide is treated with silane coupling agent.

2. The olefin-based resin composition according to claim 1, wherein:
   said at least one polyolefin (b) accounts for about 5 to 20 parts by weight of said polymeric material (i),
   said olefin-based polymer portion (c) accounts for about 5 to 30 parts by weight of said polymeric material (i), and
   said at least one metal hydroxide (ii) comprises at least one metal hydroxide in an amount of about 50 to 150 parts by weight.

3. The olefin-based resin composition according to claim 1, wherein said at least one metal hydroxide (ii) comprises at least one metal hydroxide in an amount of about 70 to 90 parts by weight.

4. The olefin-based resin composition according to claim 2, wherein said at least one metal hydroxide (ii) comprises at least one metal hydroxide in an amount of about 70 to 90 parts by weight.

5. The olefin-based resin composition according to claim 1, wherein said propylene polymer portion (a) comprises at least one of propylene-ethylene block copolymer in which propylene constitutes at least about 50% by weight of said block copolymer, propylene-ethylene random copolymer in which propylene constitutes at least about 50% by weight of said random copolymer, and propylene homopolymer.

6. The olefin-based resin composition according to claim 2, wherein said propylene polymer portion (a) comprises at least one of propylene-ethylene block copolymer in which propylene constitutes at least about 50% by weight of said block copolymer, propylene-ethylene random copolymer in which propylene constitutes at least about 50% by weight of said random copolymer, and propylene homopolymer.

7. The olefin-based resin composition according to claim 3, wherein said propylene polymer portion (a) comprises at least one of propylene-ethylene block copolymer in which propylene constitutes at least about 50% by weight of said block copolymer, propylene-ethylene random copolymer in which propylene constitutes at least about 50% by weight of said random copolymer, and propylene homopolymer.

8. The olefin-based resin composition according to claim 1, wherein said at least one polyolefin (b) comprises at least polypropylene structurally modified through maleic acid anhydride treatment.

9. The olefin-based resin composition according to claim 2, wherein said at least one polyolefin (b) comprises at least polypropylene structurally modified through maleic acid anhydride treatment.

10. The olefin-based resin composition according to claim 3, wherein said at least one polyolefin (b) comprises at least polypropylene structurally modified through maleic acid anhydride treatment.

11. The olefin-based resin composition according to claim 5, wherein said at least one polyolefin (b) comprises at least polypropylene structurally modified through maleic acid anhydride treatment.

12. The olefin-based resin composition according to claim 8, wherein said at least one polyolefin (b) comprises at least polypropylene structurally modified through maleic acid anhydride treatment.

13. The olefin-based resin composition according to claim 1, wherein said olefin-based polymer portion (c) comprises at least one of ethylene-vinyl acetate copolymer and ethylene-ethyl acrylate copolymer.

14. The olefin-based resin composition according to claim 2, wherein said olefin-based polymer portion (c) comprises at least one of ethylene-vinyl acetate copolymer and ethylene-ethyl acrylate copolymer.

15. The olefin-based resin composition according to claim 3, wherein said olefin-based polymer portion (c) comprises at least one of ethylene-vinyl acetate copolymer and ethylene-ethyl acrylate copolymer.

16. The olefin-based resin composition according to claim 5, wherein said olefin-based polymer portion (c) comprises. at least one of ethylene-vinyl acetate copolymer and ethylene-ethyl acrylate copolymer.

17. The olefin-based resin composition according to claim 8, wherein said olefin-based polymer portion (c) comprises at least one of ethylene-vinyl acetate copolymer and ethylene-ethyl acrylate copolymer.

18. The olefin-based resin composition according to claim 1, wherein said at least one metal hydroxide (ii) comprises magnesium hydroxide.

19. The olefin-based resin composition according to claim 2, wherein said at least one metal hydroxide (ii) comprises magnesium hydroxide.

20. The olefin-based resin composition according to claim 3, wherein said at least one metal hydroxide (ii) comprises magnesium hydroxide.

21. The olefin-based resin composition according to claim 5, wherein said at least one metal hydroxide (ii) comprises magnesium hydroxide.

22. The olefin-based resin composition according to claim 8, wherein said at least one metal hydroxide (ii) comprises magnesium hydroxide.

23. The olefin-based resin composition according to claim 1, wherein said silane coupling agent comprises aminosilane coupling agent.

24. The olefin-based resin composition according to claim 2, wherein said silane coupling agent comprises aminosilane coupling agent.

25. The olefin-based resin composition according to claim 3, wherein said silane coupling agent comprises aminosilane coupling agent.

26. The olefin-based resin composition according to claim 5, wherein said silane coupling agent comprises aminosilane coupling agent.

27. The olefin-based resin composition according to claim 8, wherein said silane coupling agent comprises aminosilane coupling agent.

28. The olefin-based resin composition according to claim 1, wherein the olefin-based resin composition is halogen-free.

29. The olefin-based resin composition according to claim 2, wherein the olefin-based resin composition is halogen-free.

30. The olefin-based resin composition according to claim 3, wherein the olefin-based resin composition is halogen-free.

31. The olefin-based resin composition according to claim 5, wherein the olefin-based resin composition is halogen-free.

32. The olefin-based resin composition according to claim 8, wherein the olefin-based resin composition is halogen-free.

33. An olefin-based resin composition which is substantially free of halogen, said olefin-based resin composition comprising:
  (i) a polymeric material in an amount of 100 parts by weight which includes:
    (a) about 50 to 95 parts by weight of propylene polymer portion comprising at least one propylene polymer having a melt flow rate of up to about 5 g/10 min;
    (b) about 1 to 20 parts by weight of at least one polyolefin, a proportion of about 0.1 to 10% by weight of which is structurally modified through maleic acid anhydride treatment; and
    (c) about 5 to 40 parts by weight of olefin-based polymer portion comprising at least one ethylene-α-olefin copolymer; and
  (ii) about 30 to 200 parts by weight of at least one metal hydroxide, wherein the at least one metal hydroxide is treated with silane coupling agent.

34. An electrical cable coated with an olefin-based resin composition, said olefin-based resin composition comprising:
  (i) a polymeric material in an amount of 100 parts by weight which includes:
    (a) about 50 to 95 parts by weight of propylene polymer portion comprising at least one propylene polymer having a melt flow rate of up to about 5 g/10 min;
    (b) about 1 to 20 parts by weight of at least one polyolefin, a proportion of about 0.1 to 10% by weight of which is structurally modified through maleic acid anhydride treatment; and
    (c) about 5 to 40 parts by weight of olefin-based polymer portion comprising at least one ethylene-α-olefin copolymer; and
  (ii) about 30 to 200 parts by weight of at least one metal hydroxide, wherein the at least one metal hydroxide is treated with silane coupling agent.

* * * * *

UNITED STATES PATENT AND TRADEMARK OFFICE
CERTIFICATE OF CORRECTION

PATENT NO. : 6,476,138 B2
DATED : November 5, 2002
INVENTOR(S) : M. Sato et al.

It is certified that error appears in the above-identified patent and that said Letters Patent is hereby corrected as shown below:

<u>Title page,</u>
Item [57], ABSTRACT,
Line 16, "apolymer" should be -- polymer --.

<u>Column 10,</u>
Line 28, after "comprises" delete ".".

Signed and Sealed this

Twelfth Day of August, 2003

JAMES E. ROGAN
*Director of the United States Patent and Trademark Office*